(12) United States Patent
Moore et al.

(10) Patent No.: US 8,861,106 B2
(45) Date of Patent: Oct. 14, 2014

(54) VARIABLE MONOCHROMATIC UNIFORM CALIBRATION SOURCE

(75) Inventors: John R. Moore, McKinney, TX (US); Randall W. Zywicki, McKinney, TX (US)

(73) Assignee: Raytheon Company, Waltham, MA (US)

( * ) Notice: Subject to any disclaimer, the term of this patent is extended or adjusted under 35 U.S.C. 154(b) by 109 days.

(21) Appl. No.: 13/309,618

(22) Filed: Dec. 2, 2011

(65) Prior Publication Data
US 2013/0141791 A1    Jun. 6, 2013

(51) Int. Cl.
*G02B 5/22* (2006.01)
*G02B 5/28* (2006.01)

(52) U.S. Cl.
USPC .............................. 359/890; 359/892; 359/590

(58) Field of Classification Search
None
See application file for complete search history.

(56) References Cited

U.S. PATENT DOCUMENTS

| | | | |
|---|---|---|---|
| 4,806,764 A * | 2/1989 | Satake | 250/339.07 |
| 5,400,116 A * | 3/1995 | Jehan et al. | 355/53 |
| 6,459,844 B1 | 10/2002 | Pan | |
| 6,700,690 B1 | 3/2004 | Buchsbaum et al. | |
| 6,785,002 B2 | 8/2004 | Zarrabian et al. | |
| 7,592,588 B2 | 9/2009 | Moskun et al. | |
| 7,628,507 B2 | 12/2009 | Allen et al. | |

FOREIGN PATENT DOCUMENTS

| | | |
|---|---|---|
| DE | 10 2008 019500 A1 | 4/2009 |
| WO | 9800689 A1 | 1/1998 |

OTHER PUBLICATIONS

Yasuji, Yamamoto; Development of a Spectral Response Calibration System Using a Wavelength-Tunable Laser and an Integrating Sphere; SICE 2002; Proceedings of the 41st SICE Annual Conference; vol. 41; pp. 2082-2087.

\* cited by examiner

*Primary Examiner* — Jade R Chwasz
(74) *Attorney, Agent, or Firm* — Burns & Levinson LLP; Joseph M. Maraia

(57) ABSTRACT

Systems for generating uniform monochromatic electromagnetic radiation that include an electromagnetic radiation source and a bandpass filter assembly to filter electromagnetic radiation emitted by the electromagnetic radiation source. The systems also include an optical integrating sphere to receive the filtered electromagnetic radiation and to uniformly scatter the filtered electromagnetic radiation within the optical integrating sphere, wherein the optical integrating sphere comprises an output to emit the uniformly scattered, filtered electromagnetic radiation.

16 Claims, 5 Drawing Sheets

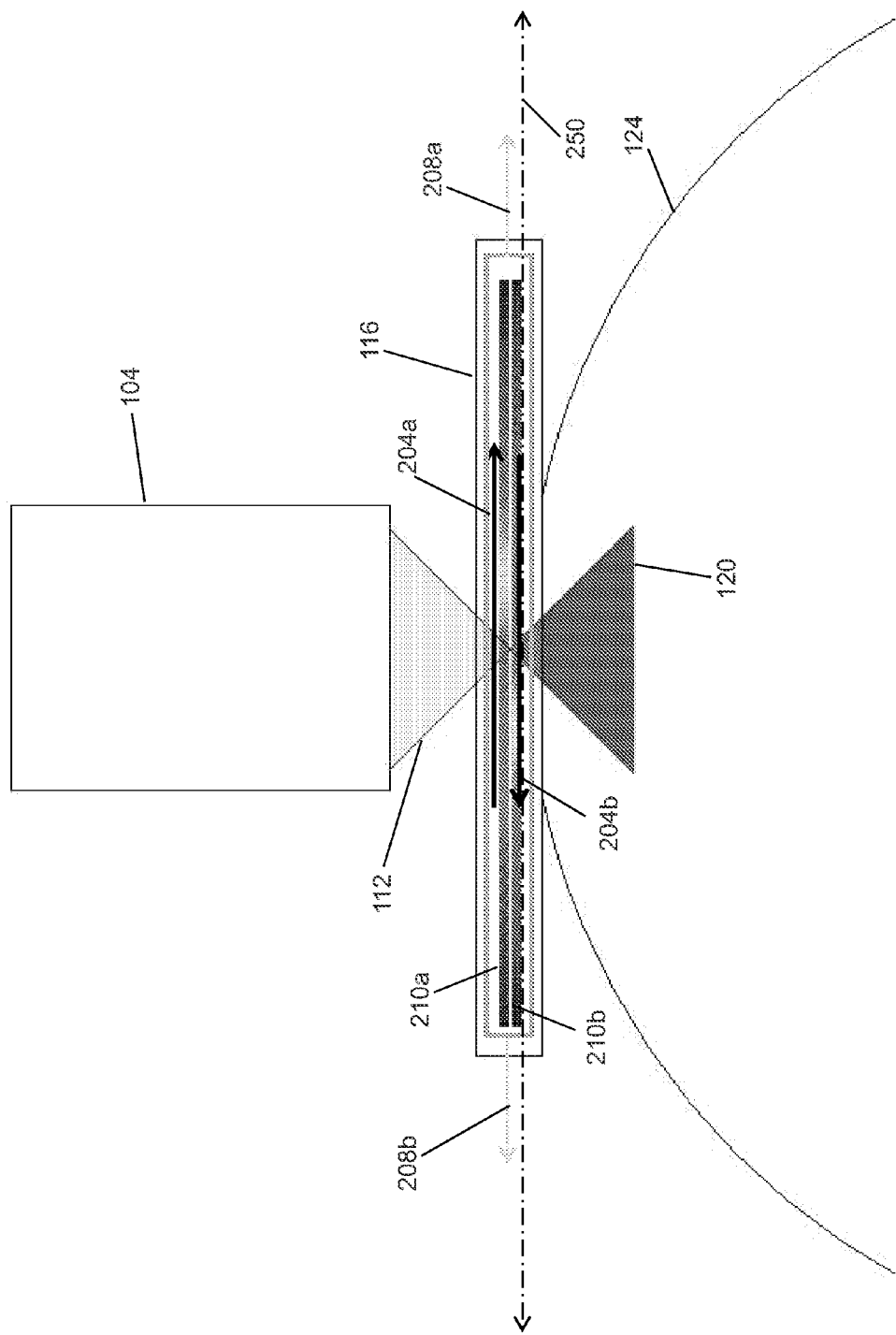

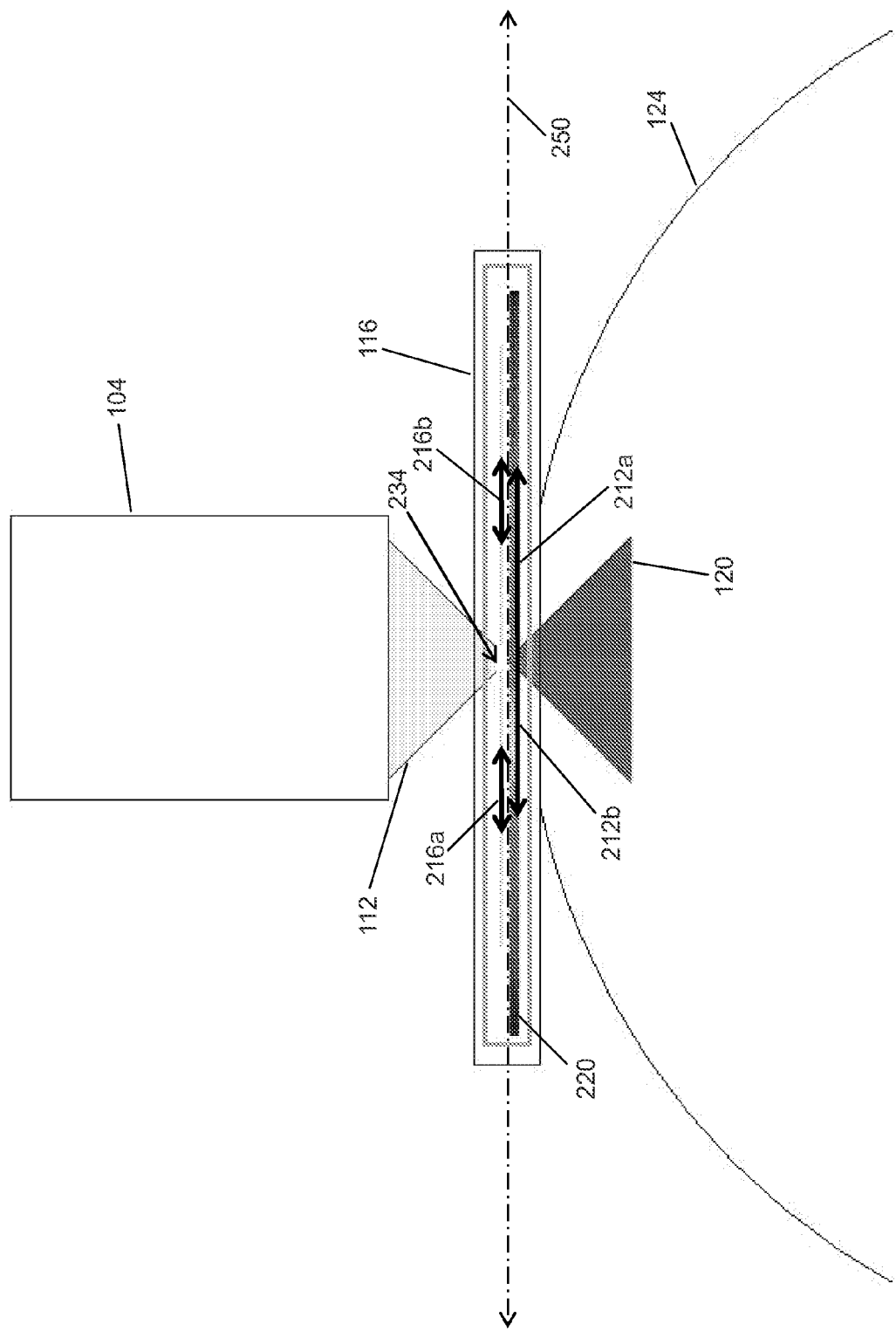

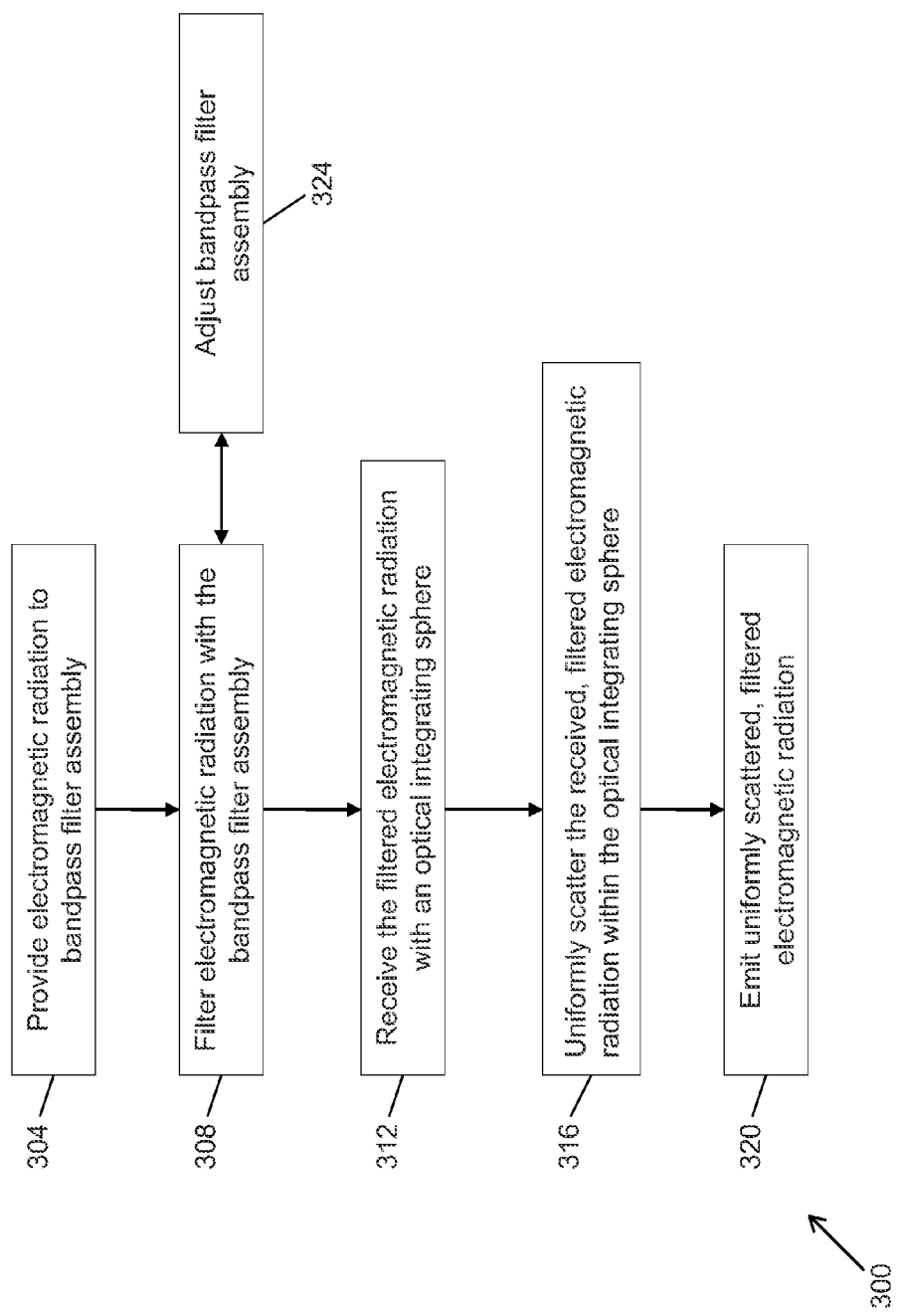

VARIABLE MONOCHROMATIC UNIFORM CALIBRATION SOURCE

FIELD OF THE INVENTION

The currently described invention relates to field capable, portable spectral and radiometric calibration sources.

BACKGROUND

Many devices, including hyperspectral imaging systems, must be calibrated for spectral, spatial and radiometric response. The calibration is traditionally completed using a scanning monochromator and a uniform source, typically an integrating sphere. This type of calibration method is plagued with problems due to non-uniform output properties of the monochromator.

A need therefore exists for improved methods and systems for generating uniform monochromatic electromagnetic radiation.

SUMMARY

One embodiment is a system for generating uniform monochromatic electromagnetic radiation. The system includes an electromagnetic radiation source and a bandpass filter assembly to filter electromagnetic radiation emitted by the electromagnetic radiation source. The system also includes an optical integrating sphere to receive the filtered electromagnetic radiation and to uniformly scatter the filtered electromagnetic radiation within the optical integrating sphere, wherein the optical integrating sphere comprises an output to emit the uniformly scattered, filtered electromagnetic radiation.

In some embodiments, the bandpass filter assembly includes two bandpass filters and a translation assembly coupled to the two bandpass filters to move the two bandpass filters to adjust the bandpass filter assembly bandwidth and center frequency. In some embodiments, the system includes an encoder assembly to measure locations of the two bandpass filters and a control system to command the translation assembly to controllably move the two linear bandpass filters based on the measured locations of the two bandpass filters.

In some embodiments, the bandpass filters are linear or rotary bandpass filters. In some embodiments, the bandpass filter assembly includes a bandpass filter, a slit assembly having an adjustable slit aperture dimension, and a translation assembly coupled to the bandpass filter and the slit assembly to move the bandpass filter and adjust the slit aperture dimension to adjust the bandpass filter assembly bandwidth and center frequency. In some embodiments, the system includes an encoder assembly to measure location of the bandpass filter and to measure the slit aperture dimension and a control system to command the translation assembly to controllably move the bandpass filter and adjust the slit aperture dimension based on the measured location of the bandpass filter and the slit aperture dimension.

In some embodiments, the system includes optical components to direct electromagnetic radiation emitted by the electromagnetic radiation source to the bandpass filter assembly. In some embodiments, the bandpass filter assembly is a variable bandpass filter assembly where bandpass filter assembly bandwidth and center frequency may be varied.

Another embodiment is a method for generating uniform monochromatic electromagnetic radiation. The method includes providing electromagnetic radiation to bandpass filter assembly. The method also includes filtering the electromagnetic radiation with the bandpass filter assembly to generate filtered electromagnetic radiation of a specified bandwidth and center frequency. The method also includes receiving the filtered electromagnetic radiation with an optical integrating sphere. The method also includes uniformly scattering the received, filtered electromagnetic radiation within the optical integrating sphere and emitting the uniformly scattered, filtered electromagnetic radiation.

In some embodiments, the bandpass filter assembly includes two bandpass filters and the method comprises moving the two bandpass filters to adjust the bandpass filter assembly bandwidth and center frequency. In some embodiments, the bandpass filter assembly includes a bandpass filter and a slit assembly and the method includes moving the bandpass filter and adjusting the slit aperture dimension to adjust the bandpass filter assembly bandwidth and center frequency.

In some embodiments, the method includes adjusting the bandpass filter assembly to specify the bandwidth and center frequency of the bandpass filter assembly. In some embodiments, adjusting the bandpass filter assembly includes moving two bandpass filters of the bandpass filter assembly. In some embodiments, adjusting the bandpass filter assembly includes moving a bandpass filter of the bandpass filter assembly and adjusting a slit aperture dimension of a slit assembly of the bandpass filter assembly. In some embodiments, the method includes varying the bandwidth and center frequency of the bandpass filter assembly.

Other aspects and advantages of the current invention will become apparent from the following detailed description, taken in conjunction with the accompanying drawings, illustrating the principles of the invention by way of example only.

BRIEF DESCRIPTION OF THE DRAWINGS

The foregoing features of various embodiments of the invention will be more readily understood by reference to the following detailed descriptions in the accompanying drawings, in which:

FIG. 2A is a schematic illustration of a bandpass filter assembly used in generating uniform monochromatic electromagnetic radiation, according to an illustrative embodiment.

FIG. 2B is a schematic illustration of an alternative bandpass filter assembly used in generating uniform monochromatic electromagnetic radiation, according to an illustrative embodiment.

FIG. 3 is a flowchart of a method for generating uniform monochromatic electromagnetic radiation, according to an illustrative embodiment.

DETAILED DESCRIPTION OF ILLUSTRATIVE EMBODIMENTS

Figure 1:
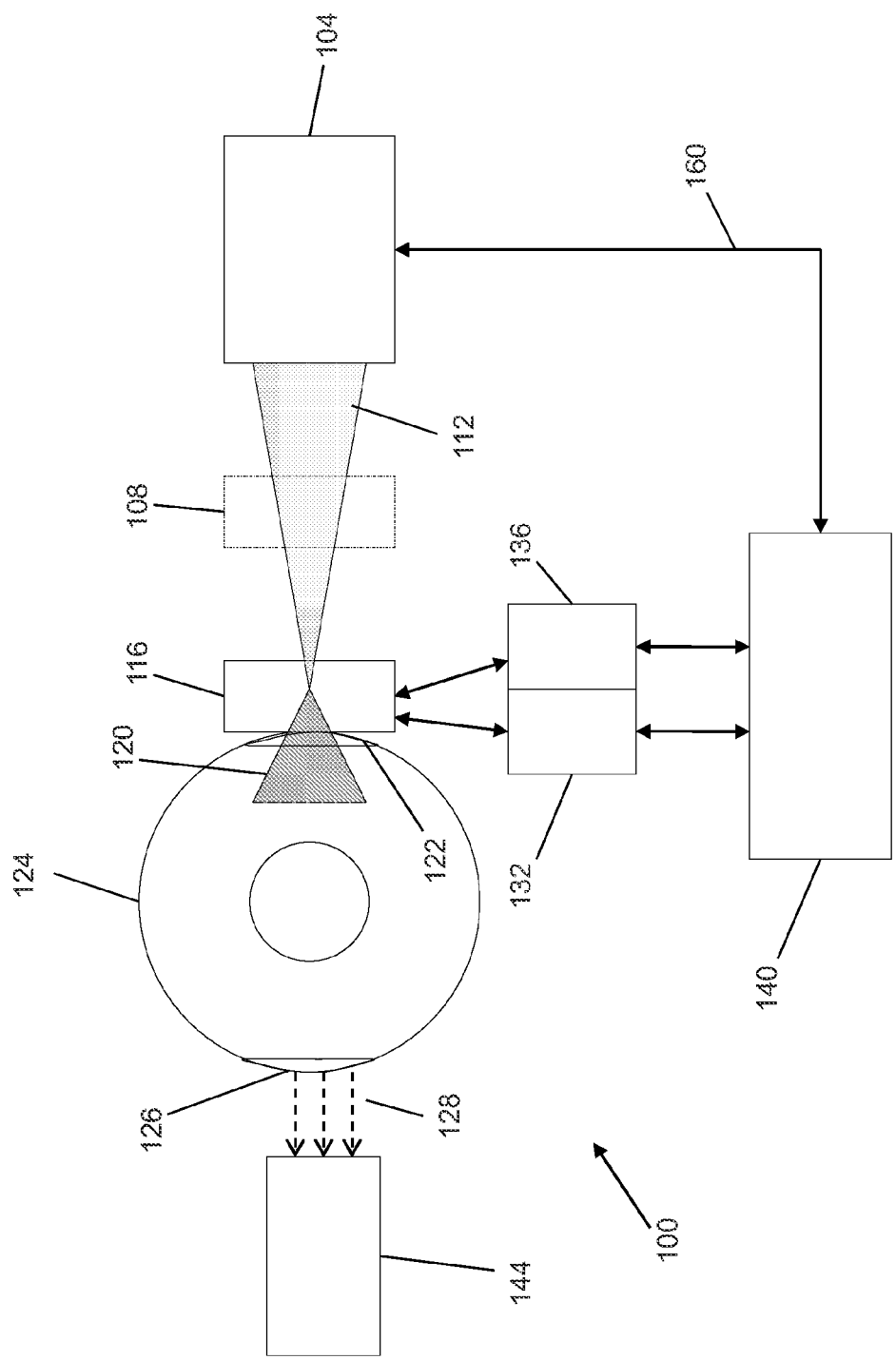
FIG. 1 is a schematic illustration of a system for generating uniform monochromatic electromagnetic radiation, according to an illustrative embodiment.

FIG. 1 is a schematic illustration of a system 100 for generating uniform monochromatic electromagnetic radiation, according to an illustrative embodiment. The system 100 includes an electromagnetic radiation source 104 and optional optical components 108. The electromagnetic radiation source 104 (e.g., tungsten quartz halogen lamp, or ceramic electromagnetic radiation element) outputs electromagnetic radiation 112 and provides the radiation 112 to a bandpass filter assembly 116. The optional optical components 108 (e.g., reflectors, diffusers, mirrors) can be used to direct the electromagnetic radiation 112 to the bandpass filter assembly 116 and/or modify the properties of the electromagnetic radiation 112. The bandpass filter assembly 116 filters the electromagnetic radiation 112 to generate filtered electromagnetic radiation 120 of a specified bandwidth and center frequency.

The system 100 also includes an optical integrating sphere 124 that receives the filtered electromagnetic radiation 120 via an optical input 122. The optical integrating sphere 124 uniformly scatters the filtered electromagnetic radiation within the optical integrating sphere 124 and emits the radiation 128 via an output 126. The emitted radiation 128 is provided to sensor 144 (e.g., a hyperspectral sensor or imaging spectrometer) to allow a user to calibrate the sensor 144. The emitted radiation 128 is uniformly scattered, filtered electromagnetic radiation 128. The optical integrating sphere 124 is an optical component that has a hollow cavity that is coated to exhibit highly diffuse reflective properties. Some embodiments have a cavity shape that is spherical. Electromagnetic radiation that impinges on any location in the cavity undergoes multiple scattering reflections to eliminate effects of the original incoming radiation due to the direction of the incoming radiation. The optical integrating sphere 124 diffuses the incoming electromagnetic radiation to minimize spatial effects in the radiation while preserving the power in the electromagnetic radiation.

In some embodiments, the bandpass filter assembly 116 also includes two bandpass filters 210a and 210b (generally 210) that are used to alter filter properties of the bandpass filter assembly 116 (as illustrated in FIG. 2A). The bandpass filter assembly 116 also includes a translation assembly 132. The translation assembly 132 is coupled to the two bandpass filters 210a, 210b to move the two bandpass filters to adjust the bandpass filter assembly bandwidth and center frequency. The bandpass filters 210a, 210b are, for example, transparent optical substrates. Each of the optical substrates has a coating that is a linearly varying multilayer interference filter that varies in thickness along the length of the substrate. The center frequency of the filter varies along the length of the substrate due to the varying thickness.

The bandwidth of the bandpass filter assembly 116 is controlled by moving one filter 210a relative to the other filter 210b along the axis 250 (defined by the lengthwise dimension of the filters). The bandpass filter assembly 116 also includes an encoder assembly 136 to measure locations of the two bandpass filters 210 to use for feedback in controlling the position of the two bandpass filters 210 with, for example, the control system 140. Controlled movement of the two filters 210 in unison sets the center frequency (as depicted by arrows 208a and 208b in FIG. 2A). Controlled movement of one filter relative to the other filter sets the bandwidth (as depicted by arrows 204a and 204b in FIG. 2A).

The bandpass filter assembly 116 also includes a control system 140 to command the translation assembly 132 to controllably move the two linear bandpass filters 210 based on the measured locations of the two bandpass filters 210 determined using the encoder assembly 136. The control system 140 is also coupled to the electromagnetic radiation source to control the output of the electromagnetic radiation source 104.

In some embodiments, the bandpass filters 210 are linear bandpass filters and the translation assembly 132 moves the filters 210 in a linear manner and the encoder assembly 136 measures locations of the filters along a linear direction. In alternative embodiments, the bandpass filters 210 are rotary bandpass filters and bandwidth and center frequency are varied in response to a rotary movement of the filters by a rotary actuator. In embodiments employing rotary bandpass filters, the encoder assembly measures rotational location/position of the rotary bandpass filters.

In some embodiments, instead of two bandpass filters, the bandpass filter assembly 116 instead includes a bandpass filter 220 and a slit assembly 230 having an adjustable slit aperture dimension 234 (as illustrated in FIG. 2B). The translation assembly 132 is coupled to the bandpass filter 220 and the slit assembly 230 to move the bandpass filter 220 and adjust the slit aperture dimension 234 to adjust the bandpass filter assembly bandwidth and center frequency of the bandpass filter assembly 116. Controlled movement of the bandpass filter 220 sets the center frequency (as depicted by arrows 212a and 212b in FIG. 2B). Controlled movement of the slit assembly to increase/decrease the slit aperture dimension adjusts the bandwidth (as depicted by arrows 216a and 216b in FIG. 2B). The control system 140 commands the translation assembly 132 to controllably move the bandpass filter 220 and adjust the slit aperture dimension 234 based on the measured location of the bandpass filter and the slit aperture dimension determined using the encoder assembly 136.

FIG. 3 is a flowchart 300 of a method for generating uniform monochromatic electromagnetic radiation, according to an illustrative embodiment. The method can be performed using, for example, the system 100 of FIGS. 1, 2A, and 2B. The method includes providing 304 electromagnetic radiation to a bandpass filter assembly. The method also includes filtering 308 the electromagnetic radiation with the bandpass filter assembly to generate filtered electromagnetic radiation of a specified bandwidth and center frequency, for example, similarly as described herein regarding FIGS. 2A and 2B. The method also includes receiving 312 the filtered electromagnetic radiation with an optical integrating sphere. The method also includes uniformly scattering 316 the received, filtered electromagnetic radiation within the optical integrating sphere and emitting 320 the uniformly scattered, filtered electromagnetic radiation.

In some embodiments, filtering the electromagnetic radiation involves adjusting 324 properties of the bandpass filter assembly. For example, in some embodiments, the bandpass filter assembly (e.g., bandpass filter assembly 116 of FIG. 1) includes two bandpass filters (see, e.g., FIG. 2A) and the method comprises moving the two bandpass filters to adjust the bandpass filter assembly bandwidth and center frequency.

In one embodiment, a first linear, motorized translation assembly stage moves one of the two filters based on an encoder measurement of the location of the filter to specify the filter bandwidth. A second linear, motorized translation assembly stage moves the second of the two filters based on an encoder measurement of the filter to specify the filter bandwidth for the second filter. Then, a third linear, motorized translation assembly stage moves both of the filters based on an encoder measurement of the locations of the two filters to specify the filter center wavelength.

In some embodiments, the bandpass filter assembly instead includes a bandpass filter and a slit assembly (see, e.g., FIG. 2B) and the method includes moving the bandpass filter and adjusting the slit aperture dimension to adjust the bandpass filter assembly bandwidth and center frequency. In some embodiments, the method includes adjusting the bandpass filter assembly to specify the bandwidth and center frequency of the bandpass filter assembly. In one embodiment, a first linear, motorized translation assembly stage moves the filter based on an encoder measurement to specify the filter center wavelength. A second linear, motorized translation assembly stage changes the slit aperture dimension to set the filter bandwidth (the bandwidth is proportional to the physically illuminated footprint created by the slit on the surface of the bandpass filter).

Figure 4:
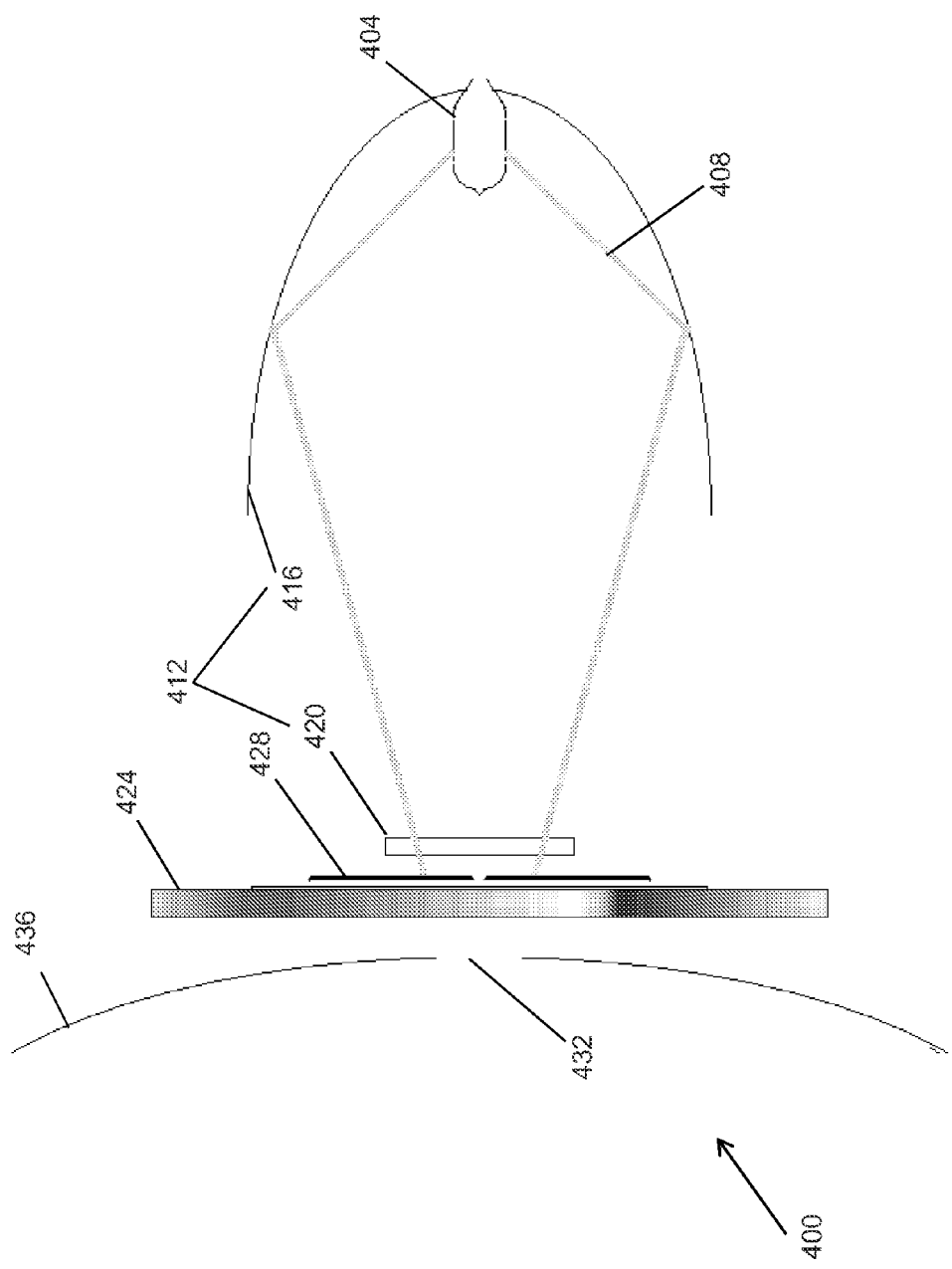
FIG. 4 is a schematic illustration of optical components for directing electromagnetic radiation to a bandpass filter assembly, according to an illustrative embodiment.

FIG. 4 is a schematic illustration of optical components for directing electromagnetic radiation to a bandpass filter assembly of a system for generating uniform monochromatic electromagnetic radiation (e.g., system 100 if FIG. 1), according to an illustrative embodiment. The system 400 includes an electromagnetic radiation source 404 (e.g., a quartz tungsten halogen lamp) that outputs electromagnetic radiation 408. The system also includes two optical components 412 (a parabolic reflector 416 and a diffuser 420). The parabolic reflector 416 reflects the electromagnetic radiation within the reflector 416 and directs the electromagnetic radiation towards the focal point of the reflector 416. The reflected electromagnetic radiation is directed towards and through the diffuser 420 to scatter the electromagnetic radiation. The optional diffuser 420 is used in some embodiments to diffuse the reflected electromagnetic radiation to create a more uniform illumination on the bandpass filter assembly prior to filtering.

The system 400 also includes a bandpass filter assembly (e.g., bandpass filter assembly 116 of FIG. 1). The bandpass filter assembly includes a bandpass filter 424 and a slit assembly 428 (other components of the bandpass filter assembly (e.g., translation stage) are not shown for clarity of illustration purposes). The electromagnetic radiation passing through the diffuser is filtered by the slit assembly 428 and the bandpass filter 424 similarly as described previously herein. The filtered electromagnetic radiation is then directed to an optical input 432 of an integrating sphere 436 (e.g., integrating sphere 124 of FIG. 1).

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

The invention claimed is:

1. A system for generating uniform monochromatic electromagnetic radiation, comprising:
   an electromagnetic radiation source;
   a bandpass filter assembly to filter electromagnetic radiation emitted by the electromagnetic radiation source; and
   an optical integrating sphere to receive the filtered electromagnetic radiation and to uniformly scatter the filtered electromagnetic radiation within the optical integrating sphere, wherein the optical integrating sphere comprises an output to emit the uniformly scattered, filtered electromagnetic radiation;
   wherein the bandpass filter assembly comprises a first bandpass filter and a second bandpass filter interposed within the optical path between the electromagnetic radiation source and the optical integrating sphere such that the electromagnetic radiation emitted by the source passes through each of the first and second bandpass filters.

2. The system of claim 1, wherein the bandpass filter assembly further comprises a translation assembly coupled to the first and second bandpass filters, the translation assembly adapted to move the first and second bandpass filters relative to one another to adjust the bandpass filter assembly bandwidth and to move the first and second bandpass filters in unison to adjust the bandpass filter assembly center frequency.

3. The system of claim 2, comprising:
   an encoder assembly to measure locations of the two bandpass filters; and
   a control system to command the translation assembly to controllably move the two linear bandpass filters based on the measured locations of the two bandpass filters.

4. The system of claim 2, wherein each of the first and second bandpass filters are linear or rotary bandpass filters, each comprising a substrate and a linearly varying interference filter coated upon, and varying in thickness along, the length of each respective substrate.

5. The system of claim 1, comprising optical components to direct electromagnetic radiation emitted by the electromagnetic radiation source to the bandpass filter assembly.

6. The system of claim 1, wherein the bandpass filter assembly is a variable bandpass filter assembly where bandpass filter assembly bandwidth and center frequency are variable.

7. A method for generating uniform monochromatic electromagnetic radiation, comprising:
   providing electromagnetic radiation to a bandpass filter assembly, wherein the bandpass filter assembly comprises a first bandpass filter and a second bandpass filter and wherein the provided electromagnetic radiation passes through each of the first and second bandpass filters;
   filtering the electromagnetic radiation with the bandpass filter assembly to generate filtered electromagnetic radiation of a specified bandwidth and center frequency;
   receiving the filtered electromagnetic radiation with an optical integrating sphere; and
   uniformly scattering the received, filtered electromagnetic radiation within the optical integrating sphere and emitting the uniformly scattered, filtered electromagnetic radiation.

8. The method of claim 7, further comprising moving the first and second bandpass filters relative to one another to adjust the bandpass filter assembly bandwidth and moving the first and second bandpass filters in unison to adjust the bandpass filter assembly center frequency.

9. The method of claim 8, wherein each of the first and second bandpass filters are linear or rotary bandpass filters, each comprising a substrate and a linearly varying interference filter that varies in thickness along the length of each respective substrate.

10. The method of claim 7, comprising varying bandwidth and center frequency of the bandpass filter assembly.

11. A system for generating uniform monochromatic electromagnetic radiation, comprising:
   an electromagnetic radiation source;
   a bandpass filter assembly to filter electromagnetic radiation emitted by the electromagnetic radiation source; and
   an optical integrating sphere to receive the filtered electromagnetic radiation and to uniformly scatter the filtered electromagnetic radiation within the optical integrating sphere, wherein the optical integrating sphere comprises an output to emit the uniformly scattered, filtered electromagnetic radiation;

the bandpass filter assembly interposed between the electromagnetic radiation source and the optical integrating sphere, comprising:
- a bandpass filter comprising a substrate and an interference filter that varies in thickness along the length of the substrate; and
- a slit assembly having an adjustable slit aperture dimension;
- wherein the filtered electromagnetic radiation received by the optical integrating sphere passes through each of the substrate and interference filter of the bandpass filter; and
- wherein the bandpass filter assembly further comprises a translation assembly coupled to the bandpass filter and the slit assembly, the translation assembly adapted to move the bandpass filter with respect to the emitted electromagnetic radiation to adjust the bandpass filter center frequency and adjust the slit aperture dimension to adjust the bandpass filter assembly bandwidth.

12. The system of claim 11, comprising:
- an encoder assembly to measure location of the bandpass filter and to measure the slit aperture dimension; and
- a control system to command the translation assembly to controllably move the bandpass filter and adjust the slit aperture dimension based on the measured location of the bandpass filter and the slit aperture dimension.

13. The system of claim 11, wherein the bandpass filter is a linear or rotary bandpass filter comprising a substrate and a linearly varying interference filter that varies in thickness along the length of the substrate.

14. A method for generating uniform monochromatic electromagnetic radiation, comprising:
- providing electromagnetic radiation to a bandpass filter assembly, wherein the bandpass filter assembly comprises:
  - a bandpass filter comprising a substrate and a linearly varying interference filter coated upon the substrate that varies in thickness along the length of the substrate; and
  - a slit assembly having an adjustable slit aperture dimension;
- filtering the electromagnetic radiation with the bandpass filter assembly to generate filtered electromagnetic radiation of a specified bandwidth and center frequency;
- receiving the filtered electromagnetic radiation with an optical integrating sphere;
- uniformly scattering the received, filtered electromagnetic radiation within the optical integrating sphere and emitting the uniformly scattered, filtered electromagnetic radiation; and
- moving the bandpass filter with respect to the emitted electromagnetic radiation to adjust the bandpass filter center frequency and adjusting the slit aperture dimension to adjust the bandpass filter assembly bandwidth.

15. The method of claim 14, wherein adjusting the bandpass filter assembly comprises moving a bandpass filter of the bandpass filter assembly and adjusting a slit aperture dimension of a slit assembly of the bandpass filter assembly.

16. The method of claim 14, wherein the bandpass filter is a linear or rotary bandpass filter comprising a substrate and a linearly varying interference filter coated upon the substrate that varies in thickness along the length of the substrate.

* * * * *